(12) United States Patent
Klaghofer et al.

(10) Patent No.: US 11,388,212 B2
(45) Date of Patent: *Jul. 12, 2022

(54) METHOD AND TELECOMMUNICATIONS ARRANGEMENT FOR TRANSFERRING MEDIA DATA HAVING DIFFERING MEDIA TYPES VIA A NETWORK SENSITIVE TO QUALITY OF SERVICE

(71) Applicant: RINGCENTRAL, INC., Belmont, CA (US)

(72) Inventors: Karl Klaghofer, Munich (DE); Jurgen Totzke, Poing (DE); Michael Tietsch, Kaufering (DE)

(73) Assignee: RINGCENTRAL, INC., Belmont, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/922,086

(22) Filed: Jul. 7, 2020

(65) Prior Publication Data

US 2020/0336527 A1  Oct. 22, 2020

Related U.S. Application Data

(63) Continuation of application No. 16/196,643, filed on Nov. 20, 2018, now Pat. No. 10,749,922, which is a (Continued)

(30) Foreign Application Priority Data

Dec. 10, 2013  (DE) .......................... 102013021157.3

(51) Int. Cl.
*H04L 65/60* (2022.01)
*H04L 65/65* (2022.01)
(Continued)

(52) U.S. Cl.
CPC ........ *H04L 65/601* (2013.01); *H04L 65/1006* (2013.01); *H04L 65/608* (2013.01);
(Continued)

(58) Field of Classification Search
None
See application file for complete search history.

(56) References Cited

U.S. PATENT DOCUMENTS 7,366,174 B2 *  4/2008  MacFaden .......... H04L 41/0816
370/230
2003/0163736 A1  8/2003  Mueller et al.
(Continued)

FOREIGN PATENT DOCUMENTS

CN  1913456  2/2007
CN  102780675  11/2012
(Continued)

OTHER PUBLICATIONS

Written Opinion of the International Searching Authority for PCT/EP2014/003201 dated Feb. 12, 2015 (Form PCT/SA/237) (German Translation).
(Continued)

*Primary Examiner* — Jeffrey R Swearingen
(74) *Attorney, Agent, or Firm* — Finnegan, Henderson, Farabow, Garrettt & Dunner, LLP

(57) ABSTRACT

A telecommunication system and a method for transferring media data from a first client over a QoS-sensitive network to a second client. The system and method can permit media data, which contain a first media type with a first traffic class and a second media type with a second traffic class to be bundled by the first client into second packets. In each second packet, the traffic class for each media type is marked in layer 4 and/or layer 5. The second packets can be transmitted toward the second client. Either before or during
(Continued)

the transfer to the network, the second packets can be unbundled using the markings in layer 4 and/or layer 5 and then bundled into first packets, each of which has only one of the traffic classes. At least some of the first packets can then be transmitted over the network to the second client.

20 Claims, 2 Drawing Sheets

Related U.S. Application Data continuation of application No. 15/102,730, filed as application No. PCT/EP2014/003201 on Dec. 10, 2014, now Pat. No. 10,165,030.

(51) Int. Cl.

| | | |
|---|---|---|
| *H04L 65/80* | (2022.01) | |
| *H04L 65/10* | (2022.01) | |
| *H04L 69/326* | (2022.01) | |
| *H04L 69/327* | (2022.01) | |
| *H04M 7/00* | (2006.01) | |
| *H04L 47/2491* | (2022.01) | |

(52) U.S. Cl.
CPC ............ *H04L 65/80* (2013.01); *H04L 69/326* (2013.01); *H04L 69/327* (2013.01); *H04M 7/006* (2013.01); *H04L 47/2491* (2013.01)

(56) References Cited

U.S. PATENT DOCUMENTS

| | | | |
|---|---|---|---|
| 2006/0182118 A1* | 8/2006 | Lam | ........................ H04L 47/13 370/395.42 |
| 2006/0245417 A1 | 11/2006 | Conner et al. | |
| 2007/0288630 A1 | 12/2007 | De Noia et al. | |
| 2008/0107119 A1 | 5/2008 | Chen et al. | |
| 2012/0281536 A1* | 11/2012 | Gell | ...................... H04W 28/18 370/235 |
| 2012/0327779 A1* | 12/2012 | Gell | ...................... H04L 47/623 370/238 |
| 2016/0135074 A1 | 5/2016 | Welin et al. | |

FOREIGN PATENT DOCUMENTS

| | | |
|---|---|---|
| CN | 103380626 | 10/2013 |
| EP | 1341357 A2 | 9/2009 |
| WO | WO2008/021182 A2 | 2/2008 |

OTHER PUBLICATIONS

International Search Report for PCT/EP2014/003201 dated Feb. 12, 2015 (Form PCT/ISA/210) (German Translation).

* cited by examiner

METHOD AND TELECOMMUNICATIONS ARRANGEMENT FOR TRANSFERRING MEDIA DATA HAVING DIFFERING MEDIA TYPES VIA A NETWORK SENSITIVE TO QUALITY OF SERVICE

CROSS-REFERENCE TO RELATED APPLICATIONS

This application is a continuation application of, and claims the benefit of priority to U.S. patent application Ser. No. 16/196,643, filed on Nov. 20, 2018, which is a continuation application of, and claims the benefit of priority to U.S. patent application Ser. No. 15/102,730, filed on Jun. 8, 2016, now patented, which is the United States national phase application under 35 U.S.C. § 371 of PCT International Patent Application No. PCT/EP2014/003201, which was filed on Dec. 1, 2014, and which claims priority to German Application No. 10 2013 021 157.3, filed on Dec. 10, 2013, the entire contents of all of which are incorporated by reference herein.

BACKGROUND OF THE INVENTION

Field of the Invention

Embodiments relate to methods for transferring media data.

Background of the Related Art

Real-time communication for VoIP (Voice over Internet Protocol) or Video over IP creates a network overlay over existing IP network infrastructures. Real-time communication is sensitive to packet loss and packet transmission impediments (in particular packet loss, delay, jitter) and can therefore be detrimental to the user's quality of experience (QoE).

In IP networks with "standard L2/L3 QoS support," traffic classes (QoS, Quality of Service) are differentiated and marked on the transmission layers 2 (layer 2, L2) and 3 (layer 3, L3). This marking makes it possible to apply different transmission priorities (Per-hop Behavior—PHB) to the network components in L2/L3 QoS-supporting networks, called QoS-sensitive networks in the invention (IEEE802.1p/DiffServ). PHB is applied on a per-packet basis based on the aforementioned markings. These markings can either be assigned at the media endpoint itself (internally) or handled externally using a recognized (media) data flow through a network element. Previously, an individual port number was assigned to each such (media) data flow, providing separation. The term "QoS-sensitive" in this case means that a PHB is executed per packet and in each node, also known as "QoS-aware." The data flows for audio and video data typically consist of a series of IP/UDP packets containing a series of real-time protocol (RTP) protocol elements as the data payload.

A mix of traffic types such as audio, video, screen-sharing, data, or gaming through the same port or even within the same flow is technically possible with the protocol, of course, but until now has not been done and is therefore not supported by the switches (L2) and routers (L3).

In this regard, two different cases should be distinguished:
1. Different flows with the same media type using the same port number (port multiplexing); Advantages: Administrative burdens on servers and on network gateways involving the ports are reduced.

2. Different media types are transferred as service components in one and the same IP packet (service multiplexing within the IP packets, in addition to port multiplexing);
Advantages: Compared to 1. there is a greater reduction of the port administrative burden and less bandwidth use, because only one IP header is needed for multiple RTP protocol elements (lower protocol overhead).

In both cases, the aforementioned ability to assign a port to a service component or media type is lost.

In the 1st case, of course, internal marking and execution at the L2 and L3 levels still function as described, but there is no possibility for external marking based on the port number.

In the 2nd case, the standard marking technique also no longer applies, because the IP packet can only carry one marking, but there are (or can be) portions of different flows and differing media types within one IP packet, most of which require different marking values.

Transferring media data (real time and non-real time), e.g., directly out from the Internet or web browsers as occurs in the current WebRTC (also known as RTCWeb) standardization approach (e.g., for Firefox, Google Chrome, etc.), is a new technology currently being defined.

In multimedia applications, the selected assignment of port to flow with the previously described "standard QoS support" leads to increased administration and implementation expense and represents a significant obstacle particularly in getting past NATs (Network Address Translations) and firewalls, and especially in the desired mass market (e.g., Google Cloud services). Therefore, WebRTC should be removed from administrating individual connections, and thereby also from the various port associations, which should be accomplished by "port multiplexing" and/or "service multiplexing."

It should be assumed that, after WebRTC technology is standardized and comes to be widely used, the L2/L3 network elements should also be given a WebRTC-compatible QoS approach. However, this transition (migration) is expected to occur only gradually and over a very long period of time. Introducing and implementing the standard QoS support was also a process that stretched over many years and is still not entirely complete.

The introduction of WebRTC (Real-Time Communication (RTC) over the Web) resulted in the urgent need for a transition/migration solution for existing network infrastructure.

To date this problem with WebRTC has not been solved. There is, of course, work being done on the SCTP (Stream Control Transmission Protocol), but these solutions do not apply to the UDP/RTP context being addressed here.

WebRTC can be used without port multiplexing (such as with SIP). In that case, however, the basic multiplexing advantages (see above) also cannot be used, either on the server side (e.g., with cloud-based systems) or for network gateways (firewall/NAT).

BRIEF SUMMARY OF THE INVENTION

Embodiments reported herein may permit transfer of media data of differing media types efficiently in an RTC environment (currently a WebRTC environment in particular) and also over available QoS-sensitive networks.

For the following description of the invention, and without limiting the general scope of the invention, it is assumed that the RTC clients are created as WebRTC clients. However, they can also be modified SIP clients.

According to the invention, media data can be transferred from a first WebRTC client (located in a network, for example) over a QoS-sensitive network using the real-time protocol (RTP) to a second WebRTC client (located in the same or a second network) as follows, wherein it should be noted that the quality of service is based on different traffic classes and the media data consist of (at least) a first media type with a first traffic class and a second type with a second traffic class: Media data with differing media types, assumed here to be of a first traffic class and a second traffic class, for example, are first bundled by the first WebRTC client into so-called "second" packets. This bundling is also known as "service multiplexing." In other words, UDP/RTP packets (UDP=User Datagram Protocol) containing mixed service classes (such as voice or speech in addition to video) can be present in one IP packet. In each of these second packets, the traffic class for each media type is marked on layer 4 and/or on layer 5 of the RTP protocol. This is known as QoS marking. It can be used to mark the RTP audio or video packet content of a single UDP/RTP packet with respective differing QoS values. These packets can then be transmitted in the direction of the second WebRTC client. However, in order for the media to be transferred over a QoS-sensitive first network that does not consider and so does not "understand" the new markings according to the invention on layer 4 and/or layer 5 of the RTP protocol, these second packets must be reconfigured beforehand. This means, in other words, that either before or during the transfer from the second network to the first network, the second packets are first unbundled (unbundling=demultiplexing) using the markings in layer 4 and/or layer 5 of the RTP protocol and then rebundled into so-called "first" packets, each of which has only one of the traffic classes. This means that first packets are created (alternatingly, if necessary) that contain either only speech data or only video data, for example. This sorting or re-multiplexing or re-bundling must already be done before the first packets can be transferred on the first QoS-sensitive network. In other words, this means that this process must occur after, if necessary, a second non-QoS-sensitive network immediately upon entry into the first network or if necessary in a third QoS-sensitive network in the transmission direction before its first router. Then the first packets can be transferred over the first network and, if necessary, additional transit networks to the second WebRTC client (located in a third network, for example).

LIST OF REFERENCE INDICATORS

Figure 1:
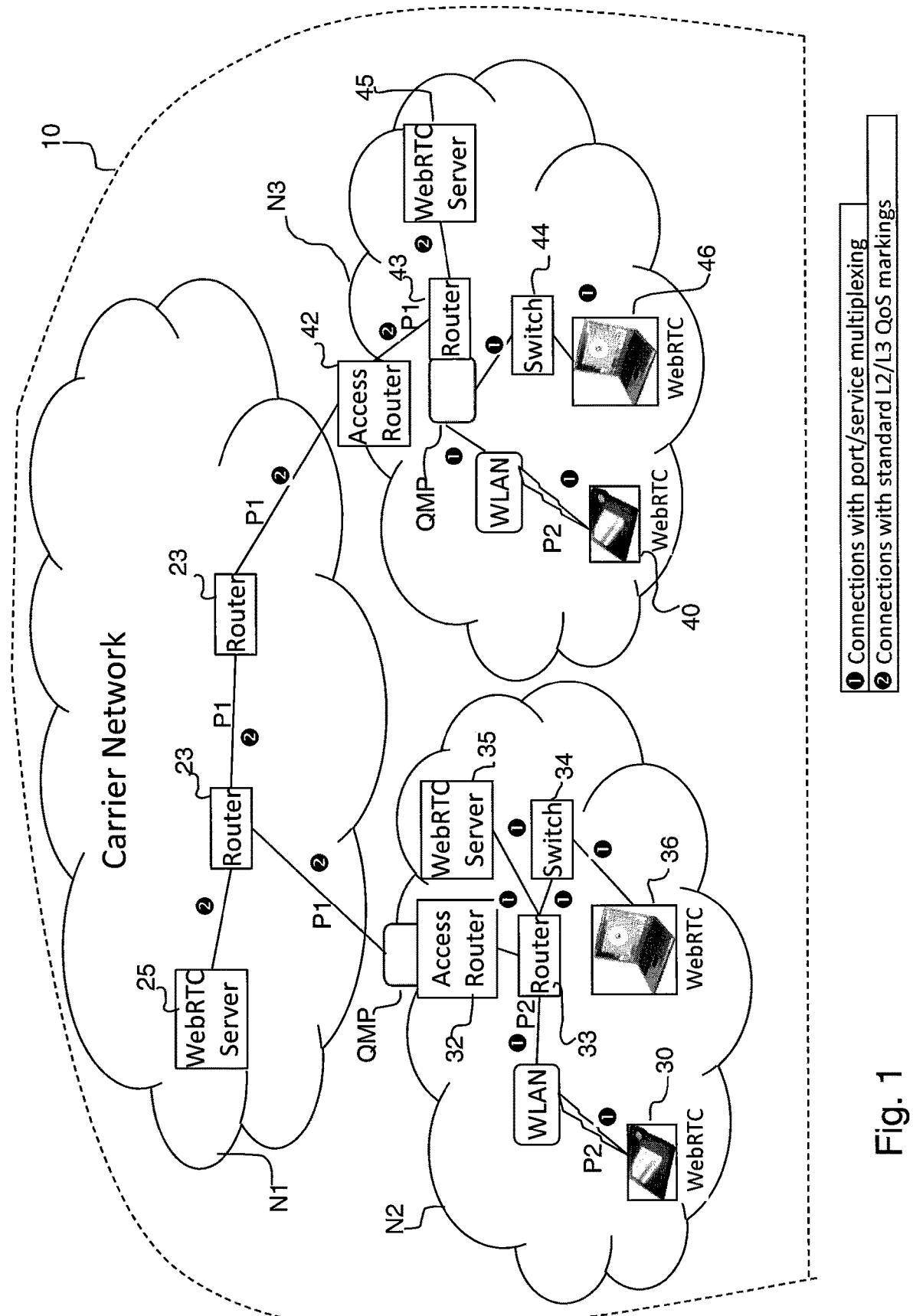
FIG. 1 shows, schematically, an invented telecommunication system according to the present invention, which is suitable for executing the invented method and in relation to which the invented method is described below.

10=Telecommunication system
23=Router
25=WebRTC server
30=First WebRTC client
32=Access router/Network gateway device
33=Router
34=Switch
35=WebRTC server
36=WebRTC browser
40=Second WebRTC client
42=Access router/Network gateway device
43=Router
44=Switch
45=WebRTC server
46=WebRTC browser
50=MAC frame
51=IP packet
52=UDP packet
53=Data payload
54=Video data
55=Audio data
90=Data carrier
92=Computer program product
N1=QoS-sensitive network for transmission
N2=Second network
N3—Third network
QMP=Marking unit
QoS=Traffic class (Quality of Service)

DETAILED DESCRIPTION OF THE INVENTION

As discussed above, according to embodiments of the invention, media data can be transferred from a first WebRTC client (located in a network, for example) over a QoS-sensitive network using the real-time protocol (RTP) to a second WebRTC client (located in the same or a second network) as follows, wherein it should be noted that the quality of service is based on different traffic classes and the media data consist of (at least) a first media type with a first traffic class and a second type with a second traffic class: Media data with differing media types, assumed here to be of a first traffic class and a second traffic class, for example, are first bundled by the first WebRTC client into so-called "second" packets. This bundling is also known as "service multiplexing." In other words, UDP/RTP packets (UDP=User Datagram Protocol) containing mixed service classes (such as voice or speech in addition to video) can be present in one IP packet. In each of these second packets, the traffic class for each media type is marked on layer 4 and/or on layer 5 of the RTP protocol. This is known as QoS marking. It can be used to mark the RTP audio or video packet content of a single UDP/RTP packet with respective differing QoS values. These packets can then be transmitted in the direction of the second WebRTC client. However, in order for the media to be transferred over a QoS-sensitive first network that does not consider and so does not "understand" the new markings according to the invention on layer 4 and/or layer 5 of the RTP protocol, these second packets must be reconfigured beforehand. This means, in other words, that either before or during the transfer from the second network to the first network, the second packets are first unbundled (unbundling=demultiplexing) using the markings in layer 4 and/or layer 5 of the RTP protocol and then rebundled into so-called "first" packets, each of which has only one of the traffic classes. This means that first packets are created (alternatingly, if necessary) that contain either only speech data or only video data, for example. This sorting or re-multiplexing or re-bundling must already be done before the first packets can be transferred on the first QoS-sensitive network. In other words, this means that this process must occur after, if necessary, a second non-QoS-sensitive network immediately upon entry into the first network or if necessary in a third QoS-sensitive network in the transmission direction before its first router. Then the first packets can be transferred over the first network and, if necessary, additional transit networks to the second WebRTC client (located in a third network, for example).

According to embodiments of the invention, this gives routers the ability to understand the markings in layer 4 and/or layer 5 (by means of (Deep) Packet Inspection, for example), to unbundle each received UDP/RTP packet, i.e., to separate the respective speech data, video, data, etc., and to deliver them to the separate router waiting sequences (queues) provided for that purpose. Before the router then forwards the data to the intended destination, new bundling or multiplexing takes place.

In summary, with the invented method it is possible to maintain the known principles of VoIP/Video over IP and QoS with a WebRTC port multiplex (i.e. there are router queues handling the various services with different priorities), even if the RTC client contains a data payload with different service types (such as voice, video) in the bundled or multiplexed IP/UDP packets. This prevents voice-router queues from being clogged with video data, for example. Therefore, other speech connections in the router queue are no longer negatively affected.

It should be emphasized that the previously described method can be used in principle with IPv4, IPv6 (Internet Protocol version 4 or version 6), for example.

In a variation of the previously described method, a router handles the unbundling. According to another variation, instead of a router, a proxy server connected upstream of the router handles the unbundling.

In another variation of the previously described method, unbundling of second packets and bundling into first packets can take place in a network access device (gateway) from a non-QoS-sensitive network to a QoS-sensitive network before or after the network boundaries.

According to one preferred embodiment of the invention, the L4/L5 markings on second packets in the IPv4 format are included in a standard-compliant, generic extension of the header of the RTP protocol element.

According to another preferred embodiment of the invention, the markings in IPv6 are added by extending the header of the second packet, wherein the extension specifically includes a list of the markings involved. Therefore, for example, for IPv6 in particular, the definition of a specific IPv6 extension header is presented, which contains a summary list of the QoS values for the RTP protocol elements contained in it and their offset (content of the IP packet). For devices that must work with the L4/L5 markings, this offers the dynamic advantage that these values do not have to be sought while possibly scattered anywhere in the IP packet (as part of the RTP protocol elements contained therein), but rather that these values can be accessed in a section of the IP layer designated specifically for that purpose. This variation therefore allows especially for very efficient and rapid L4/L5-QoS handling, even when performed in hardware, for example. Providing this type of extension header offers the further advantage that an already known or available method can be used to extend the header of a packet.

It can be advantageous if markings in the second packets that are present in layer 2 (the data link layer, e.g., Ethernet) and/or in layer 3 (the network layer, IP-header) and refer to the respective traffic classes for the media types contained in the RTP protocol elements are changed to reference markings that are present in layer 4 and/or layer 5 of the RTP protocol. On that basis the multiplexed mixed packets can then be sent to a proxy server that splits them into individual connections (e.g., voice, video). The proxy server then forwards the first packets to a peer entity in the target domain (e.g., proxy server B). Routers located along the way thus see simply individual, normal voice or video packets (or homogeneous flows) within the virtual connections, which can be processed or forwarded based on their traffic classes (voice, video, etc.).

According to another advantageous embodiment of the invented method, signaling is used to negotiate whether port multiplexing and/or service multiplexing occurs. For example, the WebRTC-expanded SDP offer/answer protocol in particular does not require the use of port multiplexing and/or service multiplexing, which in other words means that port multiplexing and/or service multiplexing is also optional with WebRTC. An alternative solution with the invention therefore consists of both WebRTC endpoints using signaling to negotiate whether or not port multiplexing and/or service multiplexing should be used. If, for example, in a network it is known that WebRTC and QoS are not adequate for port multiplexing and/or service multiplexing, such a signaling negotiation can be used to prevent port multiplexing.

It can also be advantageous for the second packets, which according to the invention are marked in layer 4 and/or layer 5, to be marked with a DSCP (Differentiated Services Code Point) value that corresponds to the "worst" value of the RTP protocol elements contained in them. In the audio/video example, this would be a so-called Assured Forwarding (AFxx) Codepoint, so that these packets can never come into conflict with speech-only connections that are standardly assigned to the so-called Expedited Forwarding (EF) DSCP code point. In this way, this type of IP packets can also be transported with at least minimal QoS characteristics in networks with standard QoS processing, but still not negatively affect at least the very critical speech connections.

In addition, a computer program or computer program product implementing the previously described invented method, and a machine-readable data carrier on which such a computer program is stored, are considered part of this invention.

The objective of the present invention is also achieved with a telecommunication system, which contains a first WebRTC client (located in a second non-QoS-sensitive network, for example), a second WebRTC client (e.g., in a third QoS-sensitive network), and a QoS-sensitive first network (connected to the second and third networks as appropriate) (and possibly additional transit networks) using the real-time protocol. In a simple arrangement, both WebRTC clients can also be located in a network that is at least partially QoS-sensitive. The invention provides for a marking unit that executes the method. This marking unit can be a processor, for example, in which the aforementioned method can run, or it can also be embedded in hardware.

Advantageously, the marking unit for a network gateway device allowing transfers from the second network to the first network is assigned to a proxy server or to a router/L3 switch or integrated into a similar device.

Because the invented method and the invented telecommunication system are closely related, the features and advantages described in relation to the method also apply similarly to the telecommunication system and vice versa, even when this is not specifically stated.

Figure 2:
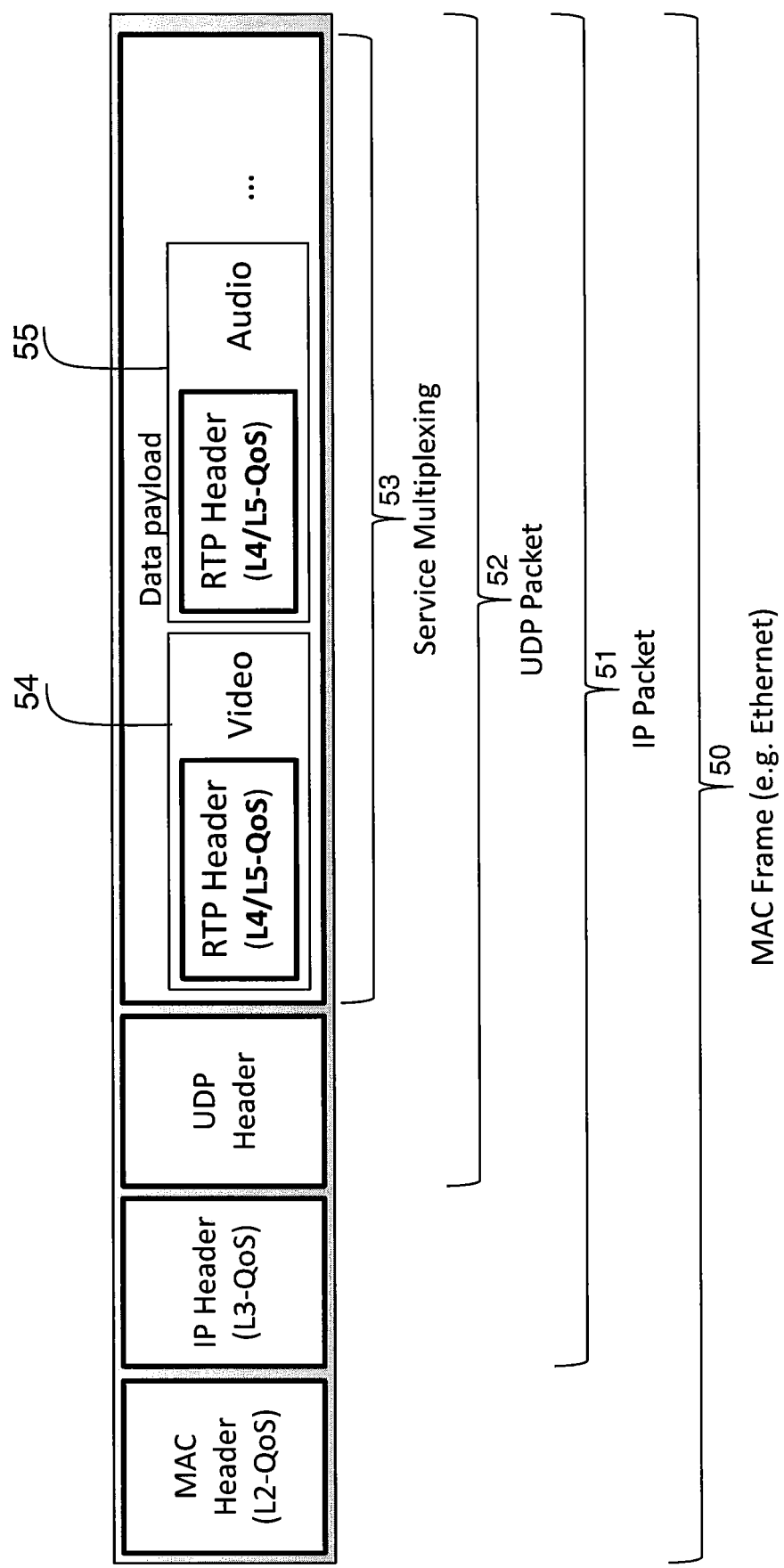
FIG. 2, shows the structure of a MAC frame with IP and UDP packets as well as RTP protocol elements.

FIG. 2 shows a MAC frame 50 (e.g. Ethernet) with IP packet 51 and UDP packet 52 embedded in it. The MAC frame 50 contains the L2-QoS marking in its MAC header. The IP packet 51 contains the L3-QoS marking in its IP header. The UDP data payloads 53 contain, by means of service multiplexing, the RTP protocol elements 54 and 55 (as illustrated, for example, by the "video" 54 and "audio"

55 services). According to the invention, the header for each of the RTP protocol elements carries the L4/L5-QoS marking, which will be explained in detail later.

FIG. 1 schematically shows an invented telecommunication system according to the present invention, which is suitable for executing the invented method and in relation to which the invented method is described below.

The schematically illustrated invented telecommunication system 10 includes in a general sense, but is not limited to, three networks. In a first network N1, a WebRTC server 25 and two routers 23 are illustrated here as an example, which are in contact with each other through QoS sensitive connections (based on different traffic classes). In this case the entire network N1 is a QoS-sensitive network. In addition, there is a network N2 that includes an access router 32, a "normal" router 33, a switch 34, a WebRTC server 35, a notebook computer with a WebRTC browser 36 running on it, and a notepad with a WebRTC browser 30 running on it. The WebRTC browser 30 here should be considered as an example of a WebRTC client that wishes to send media data with different traffic classes QoS1 and QoS2. The WebRTC client 30 is connected through WLAN to the router 33, which in turn is connected to the access router 32. In this example, all of these connections should be considered as non-QoS-sensitive. A marking unit QMP, whose function will be described later, is assigned to the access router 32.

In this example, the invented telecommunication system 10 also includes a third network N3 that includes: an access router 42 (serving as a network gateway device), a router 43, a switch 44, a WebRTC server 45, a notebook computer with a WebRTC browser 46 running on it, and a notepad with a WebRTC browser 40 running on it. The WebRTC browser 40 here should be considered as an example of a second WebRTC client. Unlike the network N2, in the network N3 a marking unit QMP is assigned to the router 43. While the connections between the router 43 and the access router 42 and to the WebRTC server 45 are "standard" QoS-sensitive connections, the other connections have port/service multiplexing (like the connections in the network N2).

It should be assumed here that the first WebRTC client 30 wants to send speech data with a QoS value QoS1, as well as video data with a QoS value QoS2 to the second WebRTC client 40 and wishes to use the services of the QoS-sensitive network N1 to do so. To do this, the first WebRTC client 30 packs the different data as appropriate into multiple second packets P2, which can also be designated as bundling or multiplexing. For each traffic class used (which can also include more than the two aforementioned traffic classes), the first WebRTC client 30 places a corresponding marking in layer 4 and/or layer 5 of the real-time protocol. These packets P2 are sent to the router 33 and forwarded by it to the access router 32. The access router 32, which can be assumed to be capable of interpreting the information in the packet heading and/or the markings in the extension of an IPv6 packet or the extensions to the layer 4/layer 5 markings in the header of the RTP protocol elements, has a marking unit QMP assigned to it, which unbundles or demultiplexes the mixed data packets P2 and creates new first packets P1 that are "type-pure," i.e., have RTP protocol elements for only one QoS traffic class. First packets P1 of this type can then be transferred by the network N1, as soon as they are sent to it by the access router 32 and forwarded to the router 23, for example. For the respective connections between individual devices, there is an indication of which type of packets—packets P1 or packets P2—are being transported. The packets P1 are then sent to the access router 42 in the network N3 and forwarded by the access router 42 to the router 43. The router 43 also has a marking unit QMP assigned to it, which unbundles the data packets P1 and reconstructs the originally existing data packets 2, wherein it waits for a certain number of packets P1 to arrive and from them combines or rebundles the corresponding media data with different media types into a new second data packet P2. These new data packets P2 are then sent to the second WebRTC client 40.

The target router 43, configured according to the invention, therefore expects the sorted UDP/IP packets P1 corresponding to a predefined sliding window that corresponds to an IP packet counter, because the different PHBs used in the network N1 to transfer the packets P1 can certainly lead to packets bypassing each other. UDP/IP packets received inside the window are reconstructed as originally received according to the RTP segment counter, and the standard DSCP code point (or the one valid for the network N3) for service-bundled RTP/UDP/IP packets is assigned before the packets are forwarded to the WebRTC client 40.

In a current or currently known QoS-sensitive network, according to the invention the following steps must take place before routing in the network: This typically occurs in connection with a router that is connected to the distribution layer of an entire network. On the other hand, if only the network N1 is QoS-sensitive, this would occur in connection with a corresponding access router. In this way, the invented marking function for layers 4 and/or 5 can be applied to one of the two sides of the network gateway.

RTP protocol elements according to RFC3550 allow the use of an RTP header extension. This possibility is shown in the RTP header. The RTP header extension includes a profile identification that must be specified according to the invention. The length specification should display as at least one for the presence of a DSCP code point (8 bits) for the respective media type and of an optional combined IP packet/RTP protocol element counter in the following 32-bit word. In the remaining 24 bits, the IP packet counter and RTP protocol element counter can be coded (with overrun), allowing for optional restoration of the original second packets before delivery to the second WebRTC client. A marking unit according to the invention (assigned to a router or proxy server, for example), that terminates the original distribution network segment and has identified an RTP/UDP/IP data flow with service multiplexing, now segments the individual RTP segments, counts and overwrites the existing IP packet number and the position of the RTP protocol element within the UPD/IP packet in the RTP header extension.

Advantageously, the router gathers the RTP protocol elements with the same DSCP code point into a recombined RTP/UDP/IP packet and overwrites the DSCP code point of the UDP/IP header corresponding to the RTP header extension, before the packet is forwarded.

In the previous description of an exemplary embodiment of the invention, it was stated that only one QoS-sensitive network N1 is available to transmit the media data from the first WebRTC client (of a non-QoS-sensitive network N2) to the second WebRTC client (of a QoS-sensitive network N3). This corresponds to a schematic network configuration chosen for the description. The network N3 in the configuration shown in FIG. 1 is also suitable for executing the invented method.

It should be noted that the features of the invention described by referencing the presented embodiments, for example the type and configuration of individual devices or components as well as individual method steps and their sequences, can also be present in other embodiments, unless stated otherwise or prohibited for technical reasons.

The invention claimed is:

1. A computer-implemented method for transferring media data, the method comprising:
    marking, in second data packets, different traffic classes in a layer 4 of a real-time protocol (RTP) to generate marked second packets;
    unbundling the marked second packets using the different traffic classes to generate unbundled second packets;
    bundling the unbundled second packets into first data packets; and
    transmitting the first data packets.

2. The computer-implemented method of claim 1, wherein marking comprises extending headers of RTP protocol elements of the second data packets.

3. The computer-implemented method of claim 2, wherein extending the headers further comprises including a list of markings of the different traffic classes.

4. The computer-implemented method of claim 1, wherein marking comprises changing the different traffic classes from a layer 2 or a layer 3 of the RTP to the layer 4 of the RTP.

5. The computer-implemented method of claim 1, wherein marking comprises marking the second data packets with a worst Differentiated Services Code Point (DSCP) value.

6. The computer-implemented method of claim 1, further comprising:
    negotiating a port multiplexing or a service multiplexing.

7. A computer-implemented method for transferring media data, the method comprising:
    marking, in second data packets, different traffic classes in a layer 5 of a real-time protocol (RTP) to generate marked second packets;
    unbundling the marked second packets using the different traffic classes to generate unbundled second packets;
    bundling the unbundled second packets into first data packets; and
    transmitting the first data packets.

8. The computer-implemented method of claim 7, wherein marking comprises extending headers of RTP protocol elements of the second data packets.

9. The computer-implemented method of claim 8, wherein extending the headers further comprises including a list of markings of the different traffic classes.

10. The computer-implemented method of claim 7, wherein marking comprises changing the different traffic classes from a layer 2 or a layer 3 of the RTP to the layer 5 of the RTP.

11. The computer-implemented method of claim 7, wherein marking comprises marking the second data packets with a worst Differentiated Services Code Point (DSCP) value.

12. A multimedia system, comprising:
    a processor;
    a memory operatively connected to the processor and storing instructions that, when executed by the processor, cause:
        marking, in second data packets, different traffic classes in a layer 4 of a real-time protocol (RTP) to generate marked second packets;
        unbundling the marked second packets using the different traffic classes to generate unbundled second packets;
        bundling the unbundled second packets into first data packets; and
        transmitting the first data packets.

13. The multimedia system of claim 12, wherein marking comprises extending headers of RTP protocol elements of the second data packets.

14. The multimedia system of claim 13, wherein extending the headers further comprises including a list of markings of the different traffic classes.

15. The multimedia system of claim 12, wherein marking comprises changing the different traffic classes from a layer 2 or a layer 3 of the RTP to the layer 4 of the RTP.

16. The multimedia system of claim 15, wherein marking comprises marking the second data packets with a worst Differentiated Services Code Point (DSCP) value.

17. A non-transitory, computer-readable medium, storing instructions that, when executed by a processor, cause:
    marking, in second data packets, different traffic classes in a layer 5 of a real-time protocol (RTP) to generate marked second packets;
    unbundling the marked second packets using the different traffic classes to generate unbundled second packets;
    bundling the unbundled second packets into first data packets; and
    transmitting the first data packets.

18. The non-transitory, computer-readable medium of claim 17, wherein marking comprises extending headers of RTP protocol elements of the second data packets.

19. The non-transitory, computer-readable medium of claim 18, wherein extending the headers further comprises including a list of markings of the different traffic classes.

20. The non-transitory, computer-readable medium of claim 17, wherein marking comprises changing the different traffic classes from a layer 2 or a layer 3 of the RTP to the layer 5 of the RTP.

* * * * *

UNITED STATES PATENT AND TRADEMARK OFFICE
CERTIFICATE OF CORRECTION

PATENT NO. : 11,388,212 B2
APPLICATION NO. : 16/922086
DATED : July 12, 2022
INVENTOR(S) : Karl Klaghofer et al.

It is certified that error appears in the above-identified patent and that said Letters Patent is hereby corrected as shown below:

On the Title Page

On page 2, Item (63), in the Related U.S. Application Data, Lines 2-3, "Dec. 10, 2014," should read --Dec. 1, 2014,--.

Item (74), in the Attorney, Agent, or Firm, Line 2, "Garettt" should read --Garrett--.

Signed and Sealed this
Ninth Day of July, 2024

Katherine Kelly Vidal
*Director of the United States Patent and Trademark Office*